US012434887B1

(12) United States Patent
Itabashi et al.

(10) Patent No.: US 12,434,887 B1
(45) Date of Patent: Oct. 7, 2025

(54) COVER

(71) Applicant: Sumitomo Riko Company Limited, Aichi (JP)

(72) Inventors: Kazuki Itabashi, Aichi (JP); Takuya Tokunaga, Novi, MI (US); Dahsel Darius Bak, Novi, MI (US)

(73) Assignee: Sumitomo Riko Company Limited, Aichi (JP)

(*) Notice: Subject to any disclaimer, the term of this patent is extended or adjusted under 35 U.S.C. 154(b) by 0 days.

(21) Appl. No.: 18/625,208

(22) Filed: Apr. 3, 2024

(51) Int. Cl.
*B65D 45/16* (2006.01)
*B65D 43/02* (2006.01)
*B65D 51/24* (2006.01)
*G10K 11/162* (2006.01)

(52) U.S. Cl.
CPC ......... *B65D 45/16* (2013.01); *B65D 43/0202* (2013.01); *B65D 51/24* (2013.01); *G10K 11/162* (2013.01); *B65D 2543/00194* (2013.01); *B65D 2543/00351* (2013.01)

(58) Field of Classification Search
CPC .... B65D 45/16; B65D 43/0202; B65D 51/24; B65D 2543/00194; B65D 2543/00351; G10K 11/162
See application file for complete search history.

(56) References Cited

U.S. PATENT DOCUMENTS

| | | | | |
|---|---|---|---|---|
| 2,769,565 A * | 11/1956 | Sottile | A45D 27/22 220/916 |
| 4,030,600 A * | 6/1977 | Heaps | B65D 19/20 229/122.34 |
| 6,948,614 B1 * | 9/2005 | Hall | A45C 11/329 206/38.1 |
| 8,777,045 B2 * | 7/2014 | Mitchell | B65D 43/16 220/666 |
| 9,365,338 B2 * | 6/2016 | Schaefer | B65D 71/02 |

(Continued)

FOREIGN PATENT DOCUMENTS

| | | |
|---|---|---|
| AU | 2022206825 | 7/2023 |
| JP | S5374401 | 7/1978 |
| WO | 2017091899 | 6/2017 |

OTHER PUBLICATIONS

Takuya Tokunaga et al., "Cover", Unpublished U.S. Appl. No. 18/500,119, filed Nov. 2, 2023.

(Continued)

*Primary Examiner* — Shawn M Braden
(74) *Attorney, Agent, or Firm* — JCIPRNET

(57) ABSTRACT

A cover is capable of covering an object by locking first locking portions and second locking portions to each other in a state where a lower end edge of a first cover body and an upper end edge of a second cover body abut. The first cover body includes a pair of first slits formed on both sides of the first locking portion and extending in a direction intersecting the lower end edge starting from the lower end edge, and a hole provided on the terminal end side of the first slits. The cover is capable of partially exposing the object by locking the first locking portion to the hole in a state where an opening/closing region having the first locking portion and sandwiched between the pair of first slits is folded back to the side of the terminal ends of the first slits along the pair of first slits.

8 Claims, 12 Drawing Sheets

(56) References Cited

U.S. PATENT DOCUMENTS

| | | | | |
|---|---|---|---|---|
| 2010/0326988 | A1* | 12/2010 | Vogel ................. | B65D 47/0804 220/254.1 |
| 2011/0266280 | A1* | 11/2011 | Thomas ............... | B65D 75/525 53/461 |
| 2015/0001234 | A1* | 1/2015 | Sanfilippo .......... | B65D 75/5838 220/837 |
| 2021/0053742 | A1* | 2/2021 | LaMance ........... | B65D 25/2858 |

OTHER PUBLICATIONS

"Search Report of Europe Counterpart Application", issued on Aug. 22, 2025, p. 1-p. 8.

* cited by examiner

COVER

BACKGROUND

Technical Field

The disclosure relates to a cover for covering an object.

Description of Related Art

A cover that covers an object is provided not only for protecting the object but also for insulating sound generated by the object from transmitting to the outside and suppressing vibration generated by the object.

For example, Japanese Patent Application Laid-Open No. 53-74401 discloses a device that covers a noise source such as an industrial machine to prevent noise. This noise prevention device uses a covering material made by adhering a sound absorbing material to the back surface of a waterproof or fireproof sheet. This covering material is fixed to the required parts on the object using Velcro tape (hook-and-loop fasteners) to prevent sound leakage to the outside. In particular, this noise prevention device discloses an example in which cuts are provided in the covering material for the covering material to be partially opened and closed, and the opening/closing portion is normally fixed with hook-and-loop fasteners. In this example, the opening/closing portion can be opened to expose a part of the object if required. Thus, maintenance work, monitoring of instruments, etc. can be performed with the covering material fixed.

In the above example, depending on the exposed location, the shape of the opening/closing portion, etc., even if the opening/closing portion is opened, the opening/closing portion may return to the original closed state when the operator releases his/her hand. In this case, the operator is required to hold down the opening/closing portion with one hand to prevent the opening/closing portion from returning, and perform the work with only the other hand, which results in poor workability.

The disclosure provides a cover that not only can properly maintain the covered state of an object but also allows the inspection work of necessary parts to be performed with good workability even in the covered state.

SUMMARY

According to one aspect of the disclosure, a cover is provided, which includes:

a first cover body made of elastomer and integrally including a first locking portion on a first end edge; and a second cover body made of elastomer and integrally including a second locking portion that is lockable to the first locking portion on a second end edge opposed to the first end edge, in which the cover is configured to cover an object with the first cover body and the second cover body by locking the first locking portion and the second locking portion to each other in a state where the first end edge and the second end edge abut against each other, the first cover body includes:

a pair of first slits formed on both sides of the first locking portion and extending in a direction that intersects the first end edge starting from the first end edge; and a locked portion provided on a terminal end side of the first slits, and the cover is configured to partially expose the object by locking the first locking portion to the locked portion in a state where an opening/closing region that includes the first locking portion and is sandwiched between the pair of first slits is folded back to the terminal end side of the first slits along the pair of first slits.

According to another aspect of the disclosure, in the above configuration, the first locking portion includes a protrusion piece that protrudes in an abutting direction from the first end edge to the second end edge, and a return piece that protrudes from the protrusion piece toward a side opposite to the abutting direction, and the locked portion is a hole through which the return piece is insertable.

According to another aspect of the disclosure, in the above configuration, the first locking portion has a groove formed between the protrusion piece and the return piece, the hole is provided on an extended surface of the opening/closing region in a state where the object is covered by the opening/closing region, and the groove is locked to an edge portion of the hole in response to the return piece being inserted into the hole.

According to another aspect of the disclosure, in the above configuration, the first cover body includes a stepped portion that is recessed from a front surface toward a back surface side, and the hole is provided in the stepped portion.

According to another aspect of the disclosure, in the above configuration, the cover further includes a first sound absorbing material that is made of foamed resin and arranged on an inner surface of the first cover body, the first sound absorbing material has a pair of second slits formed on an inner side of the opening/closing region, and the pair of second slits extend in a direction that intersects the first end edge starting from an inner end edge located on the first end edge side, the cover is configured to partially expose the object in a state where an inner opening/closing region of the first sound absorbing material sandwiched between the pair of second slits is folded back together with the opening/closing region to a terminal end side of the second slits along the pair of second slits, and the pair of second slits are covered by the opening/closing region in a state where the object is covered by the opening/closing region.

According to another aspect of the disclosure, in the above configuration, the inner opening/closing region is fixed to the opening/closing region.

According to another aspect of the disclosure, in the above configuration, the second locking portion includes a notch that is formed in the abutting direction from the second end edge, and a bridge portion that is formed along the second end edge so as to straddle the notch on an outer surface side of the second cover body, an insertion hole communicating with the notch is formed on an inner side of the bridge portion, and the first locking portion is locked to the second locking portion by inserting the protrusion piece into the insertion hole and locking the return piece to the bridge portion.

According to another aspect of the disclosure, in the above configuration, the protrusion piece includes a base end portion that protrudes from the first end edge, and a distal end portion that protrudes from a protruding end portion of the base end portion in the abutting direction, in which the return piece is formed between the base end portion and the distal end portion, and a groove that opens on a side opposite to the abutting direction is formed between the base end portion and the distal end portion, and the first locking portion is locked to the second locking portion in a non-removal state by locking the groove to the bridge portion and positioning the return piece on an outer side of the bridge portion in a state where the distal end portion and the base end portion are inserted into the insertion hole.

According to the disclosure, the covered state of the object can be properly maintained with a simple structure even though the cover bodies are made of elastomer. Therefore, a highly reliable cover can be provided.

Furthermore, by locking the first locking portion to the locked portion with the opening/closing region folded back, the open state can be maintained even if the operator does not hold down the opening/closing region with his/her hand. Therefore, the object can be exposed with the cover attached. Thus, it is possible to carry out the inspection work on necessary parts with good workability while keeping the covered state. In particular, since the first locking portion for attaching the cover is used to maintain the open state of the opening/closing region, the configuration is rational.

In another aspect of the disclosure, the locked portion is a hole through which the return piece provided on the first locking portion can be inserted. According to this aspect, the open state of the opening/closing region can be maintained with a simple structure in which the return piece is inserted into the hole and locked.

In another aspect of the disclosure, when the return piece is inserted into the hole, the groove provided in the first locking portion is locked to the edge portion of the hole. According to this aspect, the locked state between the return piece and the hole is effectively maintained, and the opening/closing region in the open state is less likely to return to the closed state unexpectedly.

In another aspect of the disclosure, the hole is provided in the stepped portion. According to this aspect, by utilizing the stepped portion, the hole can be provided at a position that allows the first locking portion to lock easily.

In another aspect of the disclosure, the pair of second slits forming the inner opening/closing region are covered by the opening/closing region when the opening/closing region covers the object. According to this aspect, even though the first sound absorbing material is provided on the inner side of the first cover body, the object can be exposed by opening the inner opening/closing region. Moreover, since the second slits are covered by the opening/closing region in the closed state, even though the first sound absorbing material has the second slits, the covered state of the object can be maintained, and foreign matter can be prevented from entering from the outside.

In another aspect of the disclosure, the inner opening/closing region is fixed to the opening/closing region. According to this aspect, the inner opening/closing region automatically follows the opening and closing of the opening/closing region. Even with the inner opening/closing region, the opening/closing region can be opened and closed without any hindrance.

In another aspect of the disclosure, the first locking portion is locked to the second locking portion by inserting the protrusion piece of the first locking portion into the insertion hole and locking the return piece to the bridge portion. According to this aspect, it is possible to easily lock and unlock the first locking portion and the second locking portion.

In another aspect of the disclosure, when the distal end portion and the base end portion are inserted into the insertion hole, the groove is locked to the bridge portion and the return piece is located on the outer side of the bridge portion, so that the first locking portion is locked to the second locking portion in a non-removal state. According to this aspect, the reliability of the locked state between the first locking portion and the second locking portion can be improved.

DESCRIPTION OF THE EMBODIMENTS

Embodiments of the disclosure will be described hereinafter based on the drawings.

Figure 1:
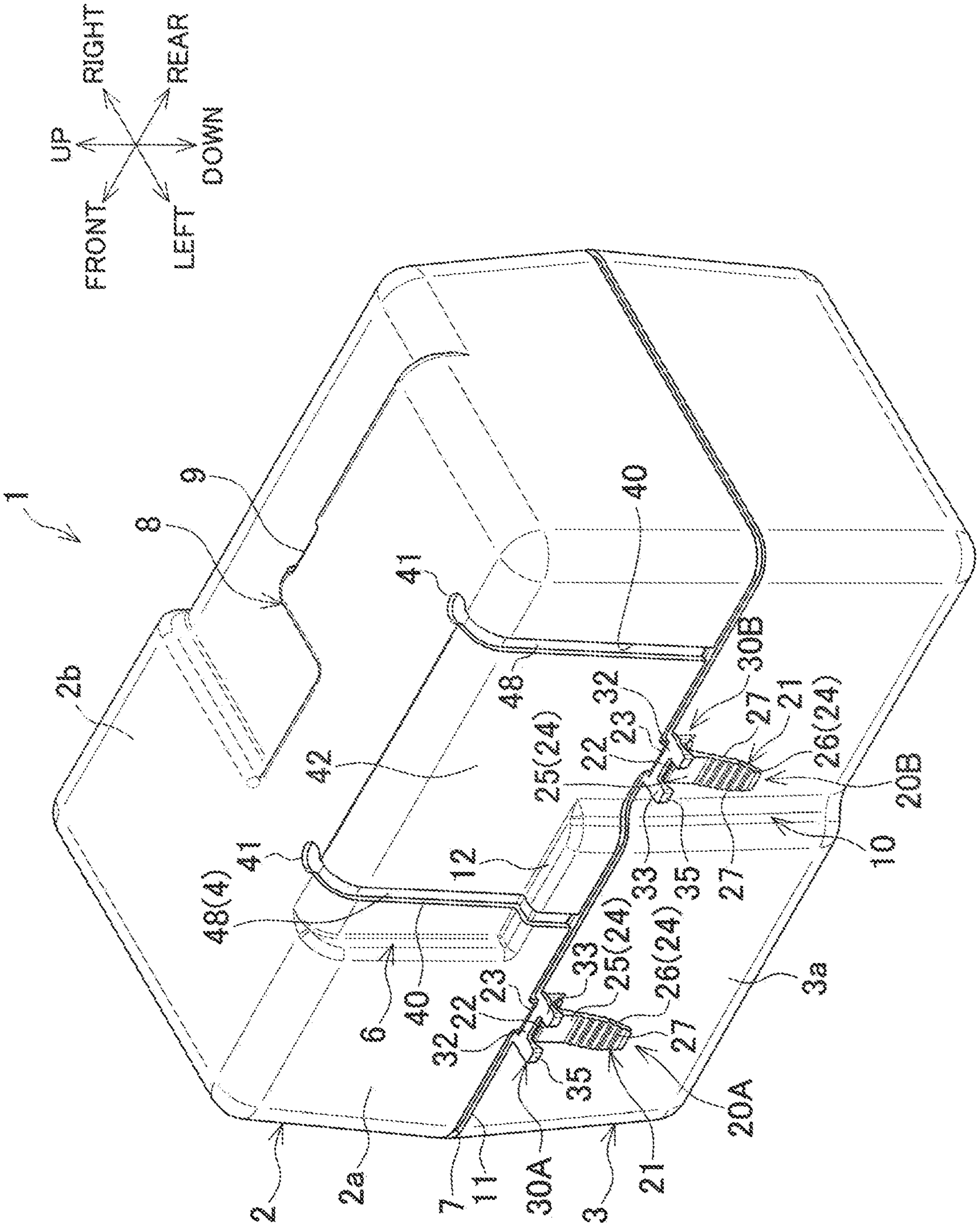
FIG. 1 is a perspective view of the cover (the opening/closing region is in a closed state).
Figure 2:
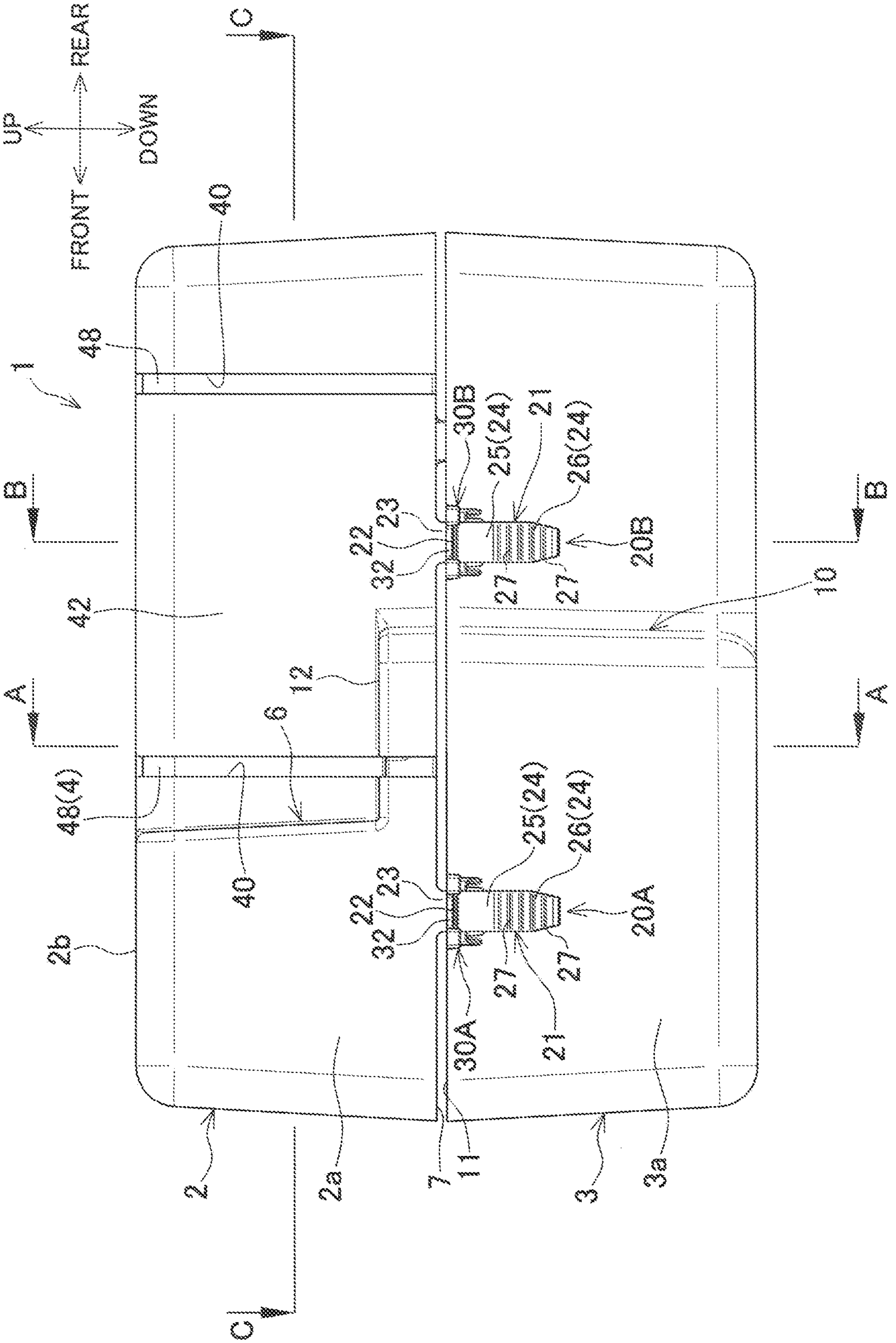
FIG. 2 is a left side view of the cover (the opening/closing region is in a closed state).
Figure 3:
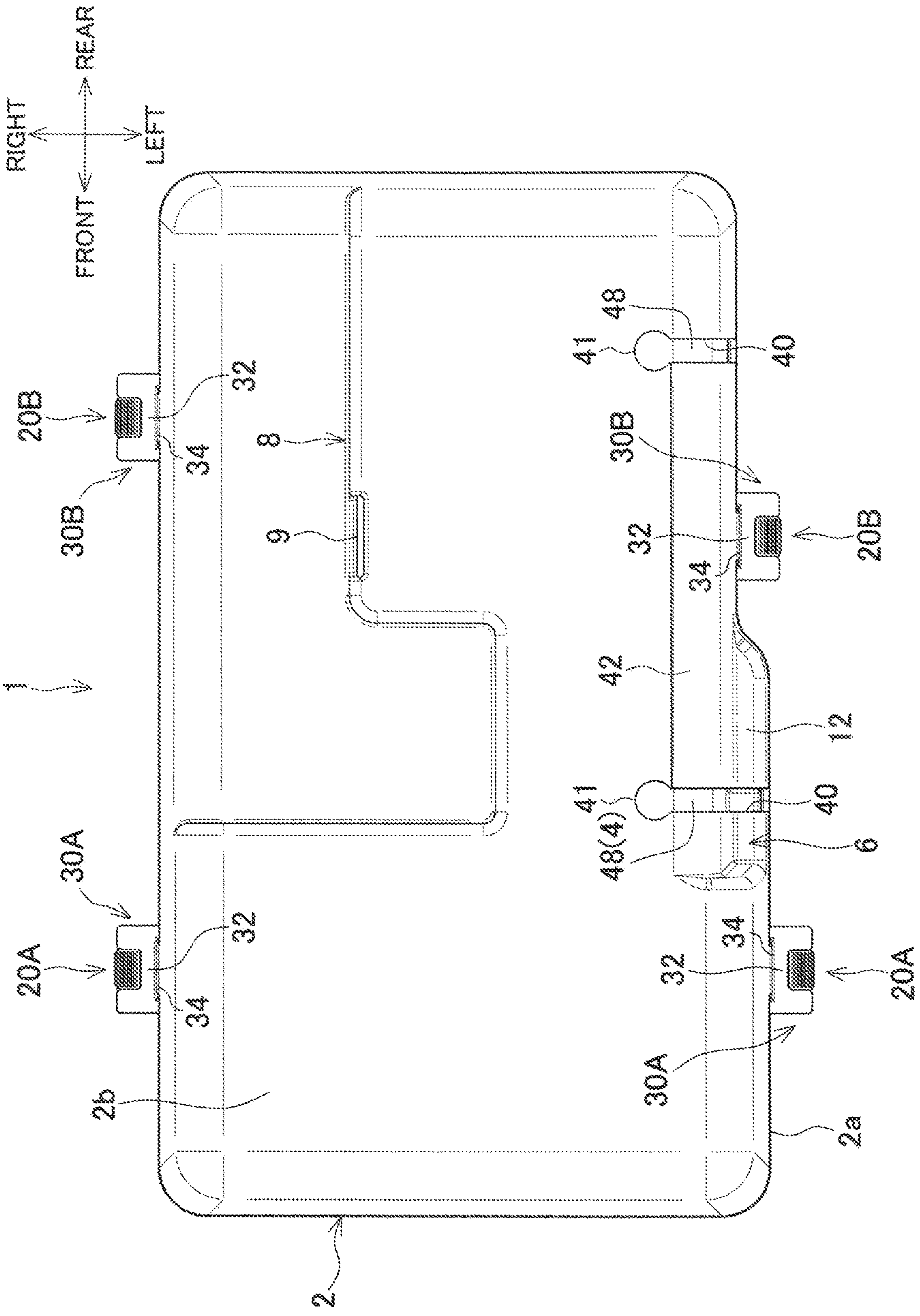
FIG. 3 is a plan view of the cover (the opening/closing region is in a closed state).
Figure 4:
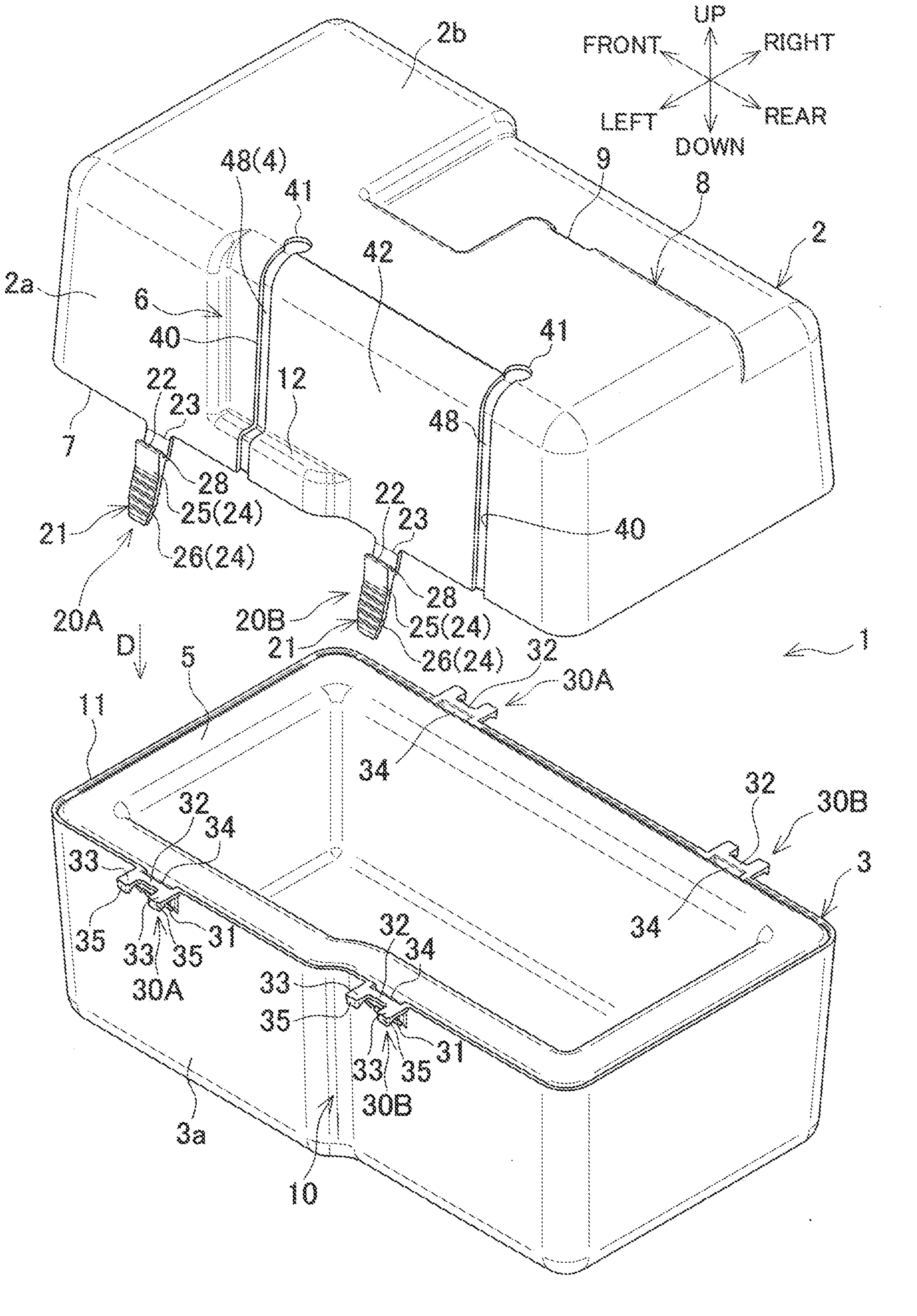
FIG. 4 is an exploded perspective view of the cover viewed from above (the opening/closing region is in a closed state).
Figure 5:
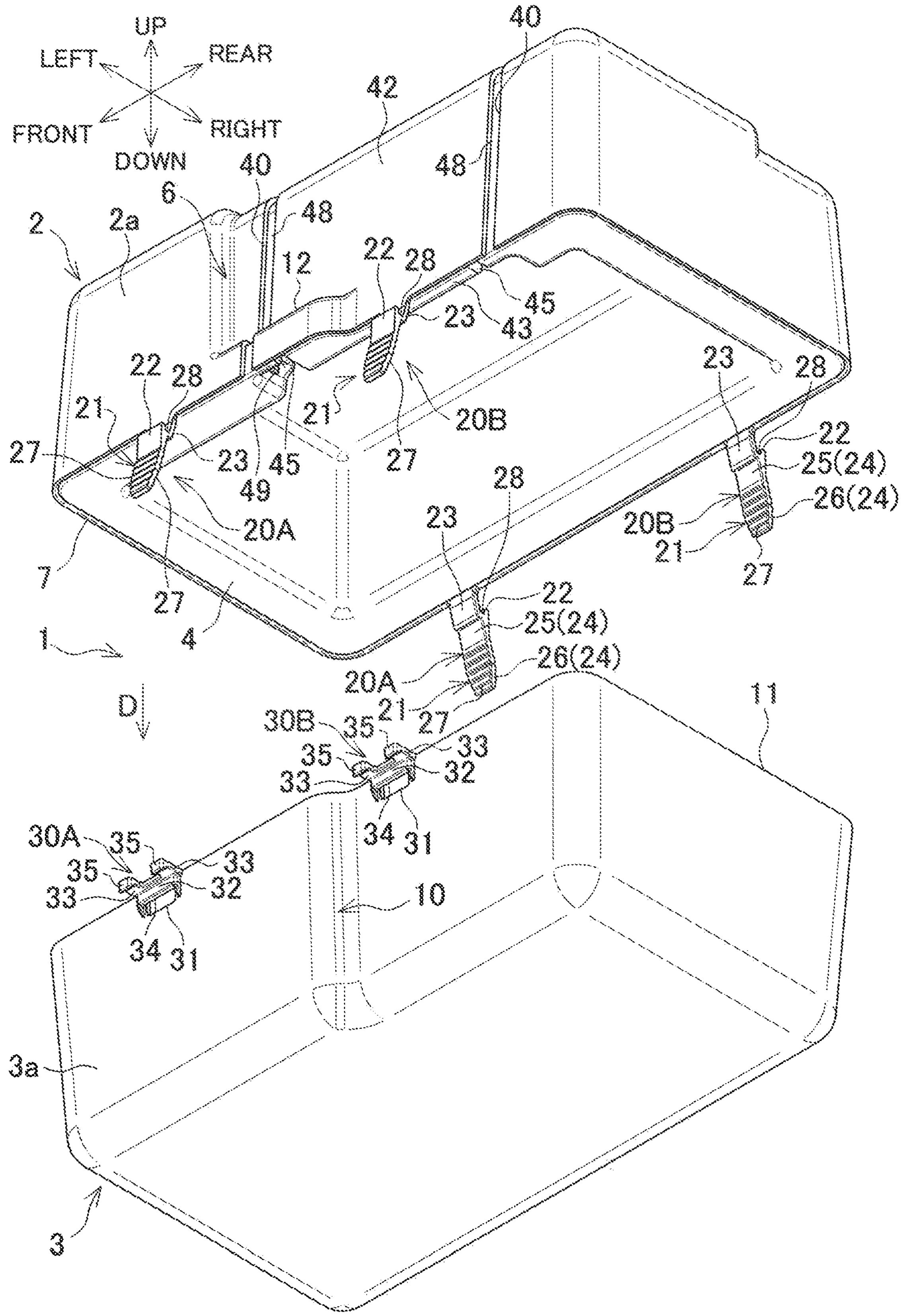
FIG. 5 is an exploded perspective view of the cover viewed from below (the opening/closing region is in a closed state).

FIG. 1 is a perspective view showing an example of a cover. FIG. 2 is a left side view of the cover. FIG. 3 is a plan view of the cover. FIG. 4 is an exploded perspective view of the cover viewed from above. FIG. 5 is an exploded perspective view of the cover viewed from below. For convenience of description, the upper side (first cover body side) in FIG. 2 is referred to as up, the lower side (second cover body side) is referred to as down, the left side in FIG. 2 is referred to as front, and the right side in FIG. 2 is referred to as rear. Then, each direction is defined with the side surface side shown in FIG. 2 as the left and the opposite side surface side as the right.

The cover 1 has a rectangular parallelepiped shape as a whole. Both front and rear ends of the rectangular parallelepiped are closed. The cover 1 is divided into upper and lower halves at substantially the center in the up-down direction. The cover 1 is formed by vertically joining a box-shaped first cover body 2 and a similarly box-shaped second cover body 3 facing each other.

Figure 6:
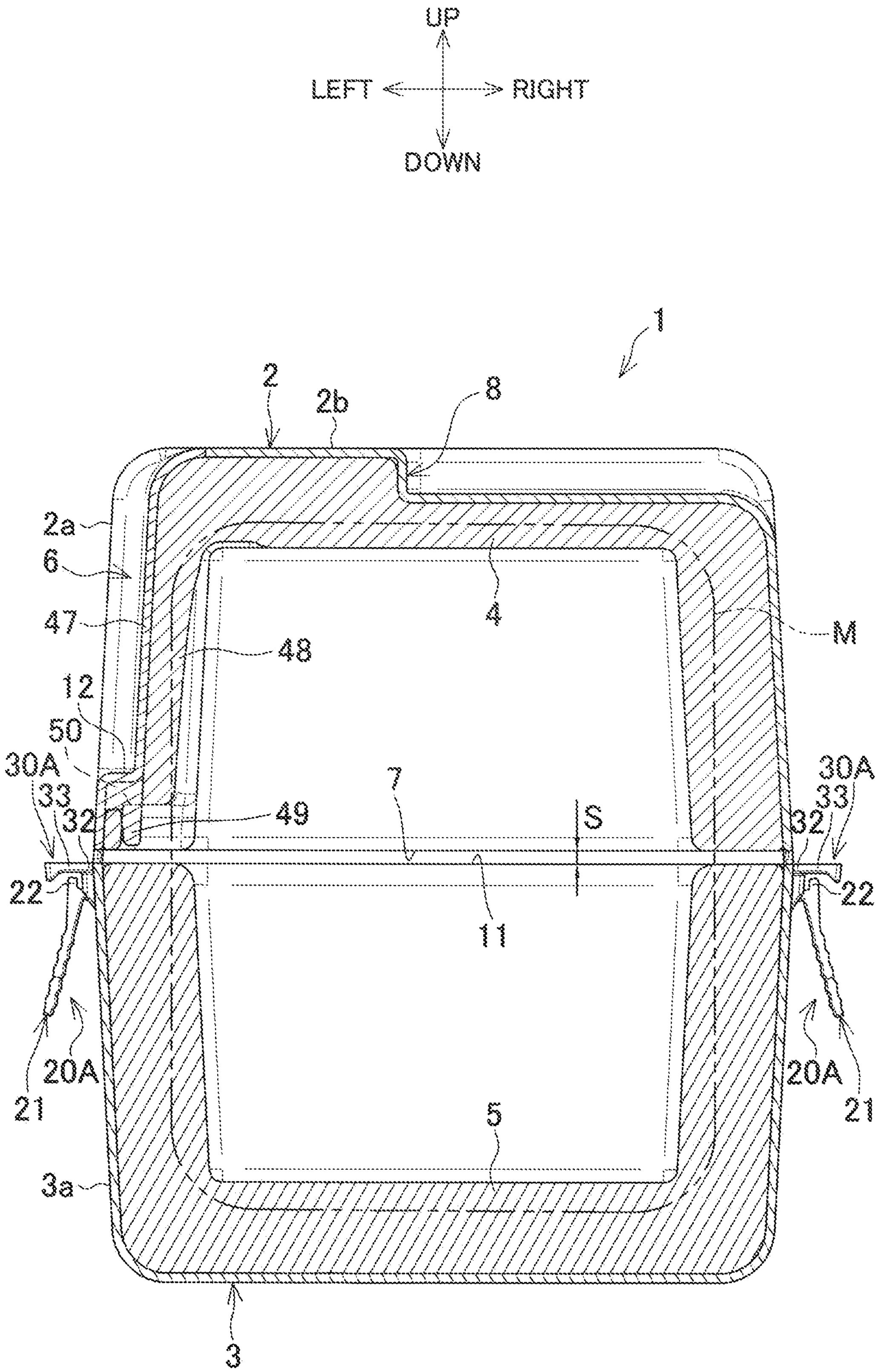
FIG. 6 is a cross-sectional view taken along the line A-A in FIG. 2.

The first cover body 2 is made of elastomer. The hardness of the elastomer is, for example, Shore A hardness of 90 to 95. As shown in FIG. 6, a first sound absorbing material 4 is integrally fixed to the entire inner surface of the first cover body 2. The first sound absorbing material 4 is made of urethane foam. Urethane foam is an example of the foamed resin of the disclosure.

The second cover body 3 is also made of elastomer. The hardness of the elastomer is, for example, Shore A hardness of 90 to 95. A second sound absorbing material 5 made of urethane foam is also fixed to the entire inner surface of the second cover body 3.

Figure 7:
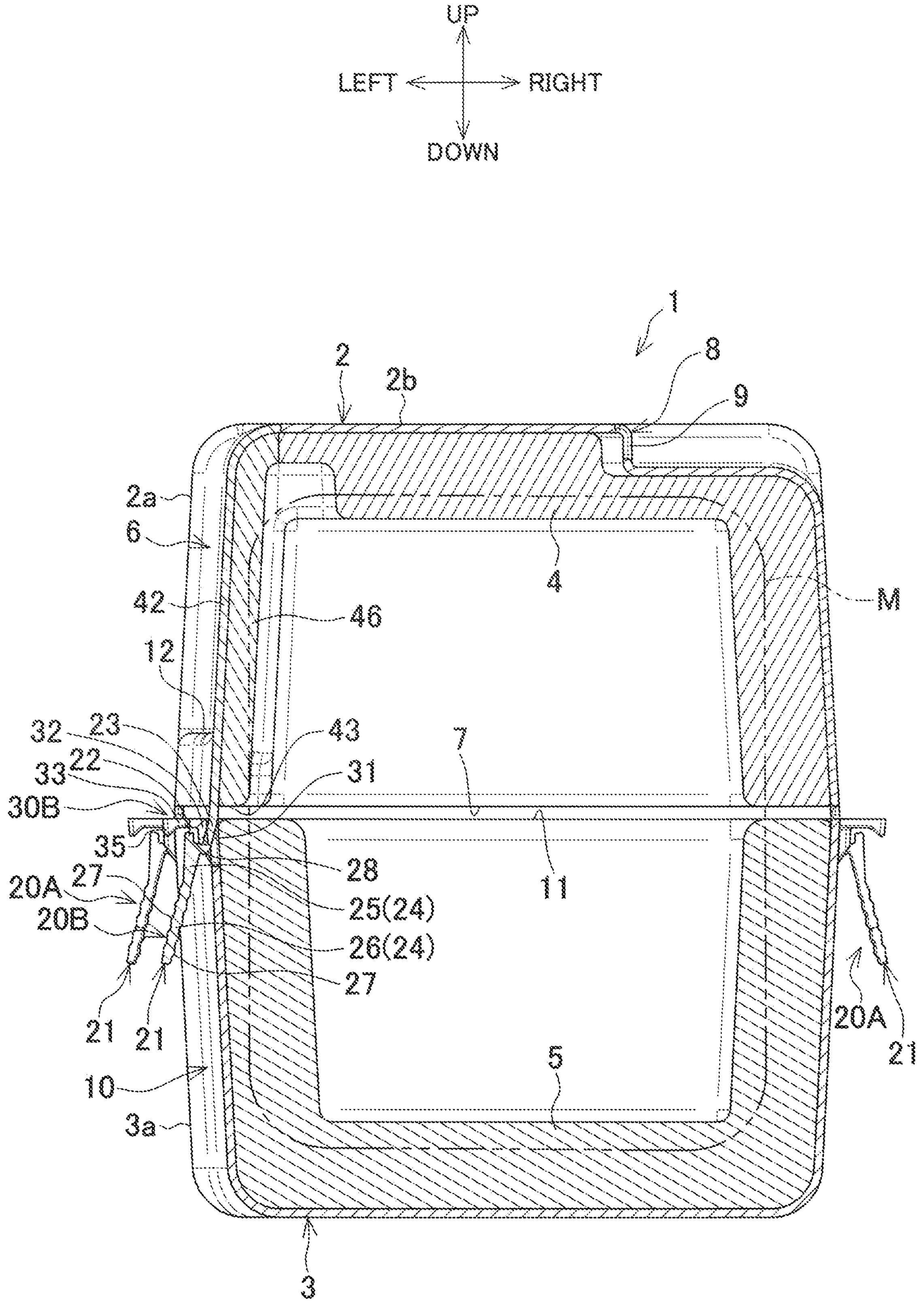
FIG. 7 is a cross-sectional view taken along the line B-B in FIG. 2.

The cover 1 is used to cover an object M shown by two-dot chain lines in FIG. 6 and FIG. 7 to protect the object M and insulate sound from the object M to the outside. The object M is, for example, a motor. The first sound absorbing material 4 and the second sound absorbing material 5 elastically deform and hold the object M while covering the object M.

A first stepped portion 6 is formed on a left side surface 2*a* of the first cover body 2. The first stepped portion 6 is recessed from the front surface to the back surface, so that the center portion and the rear portion are located on the inner side (right side) with respect to the front portion of the left side surface 2*a*. The first stepped portion 6 has a shape that extends downward from the upper end of the left side surface 2*a*, then changes the direction rearward to extend in parallel to a lower end edge 7 of the first cover body 2, and further changes the direction downward to reach the lower end edge 7.

An upper surface stepped portion 8 is provided on an upper surface 2*b* of the first cover body 2. The upper surface stepped portion 8 is also recessed from the front surface to the back surface, so that the right rear portion is located on the inner side (lower side) with respect to the front portion and the left rear portion of the upper surface 2*b*. The upper surface stepped portion 8 extends from the right end of the upper surface 2*b* to the left side, and then changes the direction rearward to extend in the front-rear direction. However, the rear portion of the upper surface stepped portion 8 extending in the front-rear direction protrudes to the right side with respect to the front portion. As shown in FIG. 7, a hole 9 that opens to the right side is formed in the upper surface stepped portion 8 that protrudes to the right side. The hole 9 exposes the first sound absorbing material 4. The upper surface stepped portion 8 is an example of the stepped portion of the disclosure. The hole 9 is an example of the locked portion of the disclosure.

A second stepped portion 10 is formed on a left side surface 3*a* of the second cover body 3. The second stepped portion 10 has a rear portion located on the inner side (right side) with respect to the front portion of the left side surface 3*a*. The second stepped portion 10 extends downward in an extension shape from the terminal end of the first stepped portion 6 that reaches the lower end edge 7.

In the first cover body 2, a pair of front and rear first locking portions 20A and 20B are integrally provided on the left and right of the lower end edge 7, respectively. The lower end edge 7 is an example of the first end edge of the disclosure.

As shown in FIG. 3, the left and right first locking portions 20A and 20A on the front side have the same front-rear positions. Regarding the left and right first locking portions 20B and 20B on the rear side, the first locking portion 20B on the left side is arranged on the front side with respect to the first locking portion 20B on the right side. The first locking portion 20B provided on the rear left side is arranged on the rear side with respect to the first stepped portion 6. Therefore, the first locking portion 20B on the rear left side is located closer to the right than the first locking portion 20A on the front side.

In the second cover body 3, a pair of front and rear second locking portions 30A and 30B are integrally provided on the left and right of an upper end edge 11, respectively. The upper end edge 11 is an example of the second end edge of the disclosure. The second locking portions 30A and 30B correspond to the first locking portions 20A and 20A at the front, rear, left, and right positions.

Therefore, when the lower end edge 7 of the first cover body 2 and the upper end edge 11 of the second cover body 3 abut against each other, the first locking portions 20A and 20B and the second locking portions 30A and 30B are opposed to each other, respectively. The first cover body 2 and the second cover body 3 are joined by respectively locking the opposing first locking portions 20A and 20B and second locking portions 30A and 30B.

The details of the first locking portions 20A and 20B will be described. The first locking portions 20A and 20B have the same structure and each include a protrusion piece 21 and a return piece 22. The protrusion piece 21 has a strip shape that protrudes from the lower end edge 7 of the first cover body 2 in the direction of abutting against the second locking portions 30A and 30B. The downward arrow D shown in FIG. 4 and FIG. 5 is the abutting direction.

The protrusion piece 21 includes a base end portion 23 and a distal end portion 24. The base end portion 23 protrudes from the lower end edge 7 in the abutting direction D, and the distal end is bent to the left and right outer sides.

The distal end portion 24 protrudes from the bent end portion of the base end portion 23 in the abutting direction D. The distal end portion 24 includes a locking plate 25 and an insertion plate 26. The locking plate 25 is continuous with the bent end portion of the base end portion 23. The insertion plate 26 is continuous with the locking plate 25. However, the insertion plate 26 is inclined at a predetermined angle to the left and right outer sides intersecting the abutting direction D with respect to the locking plate 25. Therefore, the insertion plate 26 protrudes in an inclined direction that is away from the first cover body 2 to the left and right outer sides as the insertion plate 26 extends toward the abutting direction D side.

A plurality of protrusions 27, 27, . . . are formed on both surfaces of the insertion plate 26 in the thickness direction. The protrusions 27 extend in the width direction of the insertion plate 26 and are formed at equal intervals in the protruding direction of the insertion plate 26.

The return piece 22 protrudes from the outer surface of the protrusion piece 21 between the base end portion 23 and the locking plate 25 toward the side opposite to the abutting direction D. Due to the formation of the return piece 22, a groove 28 penetrating in the width direction of the protrusion piece 21 is formed between the base end portion 23 of the protrusion piece 21 and the return piece 22. The groove 28 opens to the side opposite to the abutting direction D.

The second locking portions 30A and 30B have the same structure and each include a notch 31, a bridge portion 32, and projection portions 33 and 33. The notch 31 is formed from the upper end edge 11 of the second cover body 3 toward the abutting direction D.

The bridge portion 32 extends in a band shape along the upper end edge 11 so as to straddle the notch 31 on the outer side of the second cover body 3. Therefore, an insertion hole 34 that communicates with the notch 31 and extends along the upper end edge 11 is formed on the inner side of the bridge portion 32. The length of this insertion hole 34 in the direction along the upper end edge 11 is slightly greater than the width of the protrusion pieces 21 of the first locking portions 20A and 20B.

The projection portions 33 and 33 protrude toward the outer side from the outer surfaces on both sides of the bridge portion 32 that sandwich the notch 31. Ahead portion 35 that protrudes in a direction intersecting the abutting direction D is formed at the protruding end portion of each projection portion 33.

On the left side surface 2*a* of the first cover body 2, a pair of first slits 40 and 40 are formed on the front and rear sides of the first locking portion 20B on the rear side. The first slits 40 and 40 extend upward from the left side surface 2*a* starting from the lower end edge 7, and are continuously formed to circular terminal ends 41 and 41 formed on the upper surface 2*b*. The first slit 40 on the front side crosses an intermediate portion 12 that extends in the front-rear direction of the first stepped portion 6. Therefore, an opening/closing region 42 sandwiched between the first slits 40 and 40 is formed in the first cover body 2. The first locking portion 20B on the left side surface 2*a* is located at substantially the center of the opening/closing region 42 in the front-rear direction. On the upper surface 2*b*, the hole 9 of the upper surface stepped portion 8 is located on the extended surface of the opening/closing region 42 and on the extended surface of the first locking portion 20B. Parts that require maintenance, such as the terminal parts of the object M, are located inside the opening/closing region 42.

Figure 8:
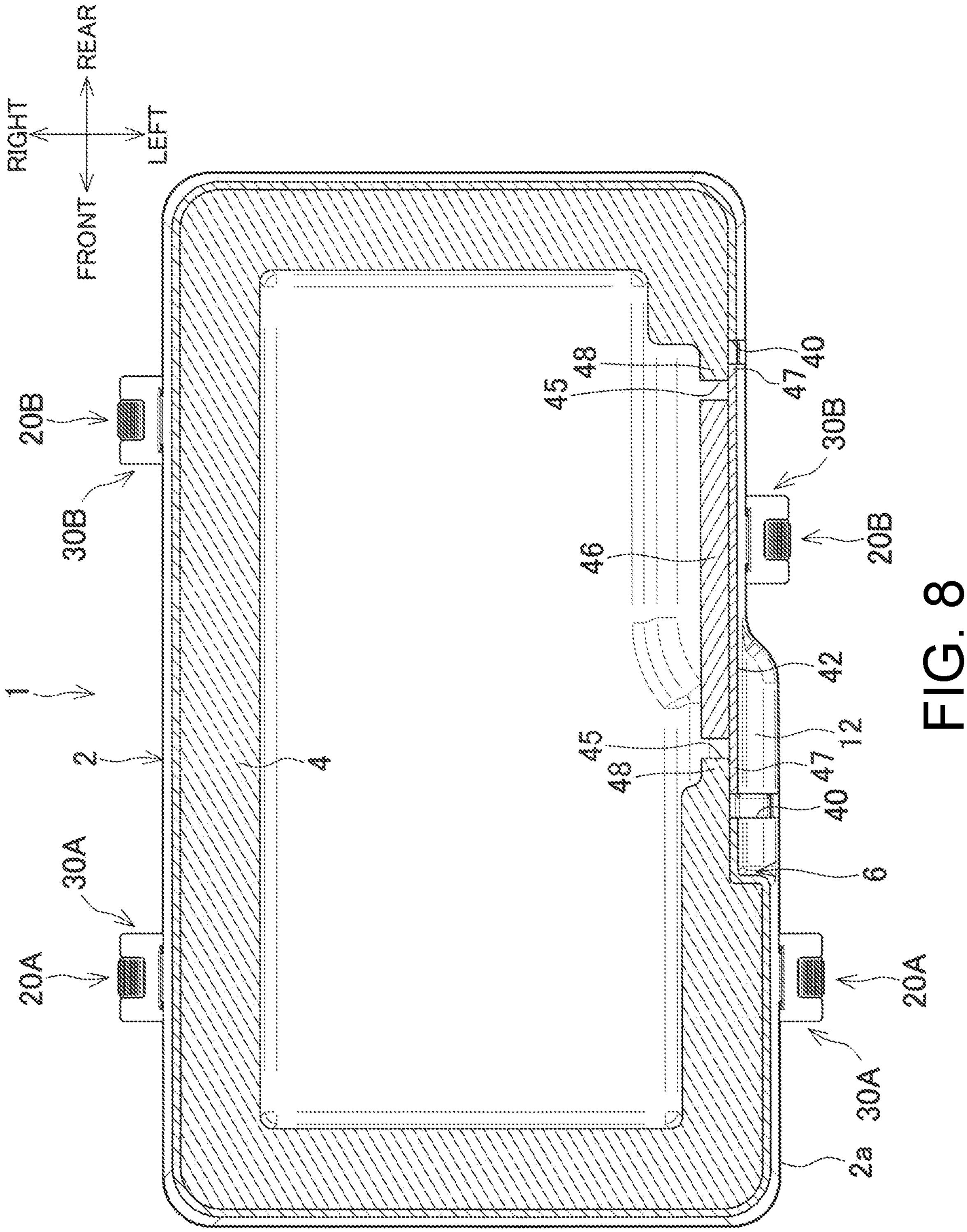
FIG. 8 is a cross-sectional view taken along the line C-C in FIG. 2.

As shown in FIG. 5 and FIG. 7, the first sound absorbing material 4 has an inner end edge 43 extending along the inner side of the lower end edge 7 of the first cover body 2. In the first sound absorbing material 4 on the inner side of the left side surface 2*a*, a pair of second slits 45 and 45 are formed on the front and rear sides of the first locking portion 20B on the rear side. The second slits 45 and 45 are arranged between the first slits 40 and 40 in the front-rear direction. The second slits 45 and 45 extend upward starting from the inner end edge 43, and are continuously formed in the same manner to the terminal ends on the inner side of the upper surface 2*b*. The terminal ends of the second slits 45 and 45 are located at substantially the same positions as the terminal ends 41 and 41 of the first slits 40 and 40 in the left-right direction. Therefore, as shown in FIG. 8, the first sound absorbing material 4 is formed with an inner opening/closing region 46 which is sandwiched between the second slits 45 and 45 and is integrated with the opening/closing region 42.

The opening/closing region 42 can be folded back together with the inner opening/closing region 46 toward the side of the terminal ends 41 and 41 of the first slits 40 and 40 by lifting the lower end edge 7 upward. Then, the opening/closing region 42 and the inner opening/closing region 46 are in an open state in which a part of the cover 1 is opened. When the opening/closing region 42 and the inner opening/closing region 46 are returned to the original positions, the opening is closed, resulting in a closed state.

The front-rear distance between the first slits 40 and 40 is greater than the front-rear distance between the second slits 45 and 45, so that the opening/closing region 42 is formed with outer projecting portions 47 and 47 that project outward from the front and rear sides of the inner opening/closing region 46. On the other hand, the first sound absorbing material 4 on the front and rear sides of the second slits 45 and 45 is formed with inner projecting portions 48 and 48 that project inward from the front and rear sides of the opening/closing region 42. When the opening/closing region 42 is in the closed state, the outer projecting portions 47 and 47 overlap the outer sides of the inner projecting portions 48 and 48, and cover the outer sides of the second slits 45 and 45.

Figure 10:
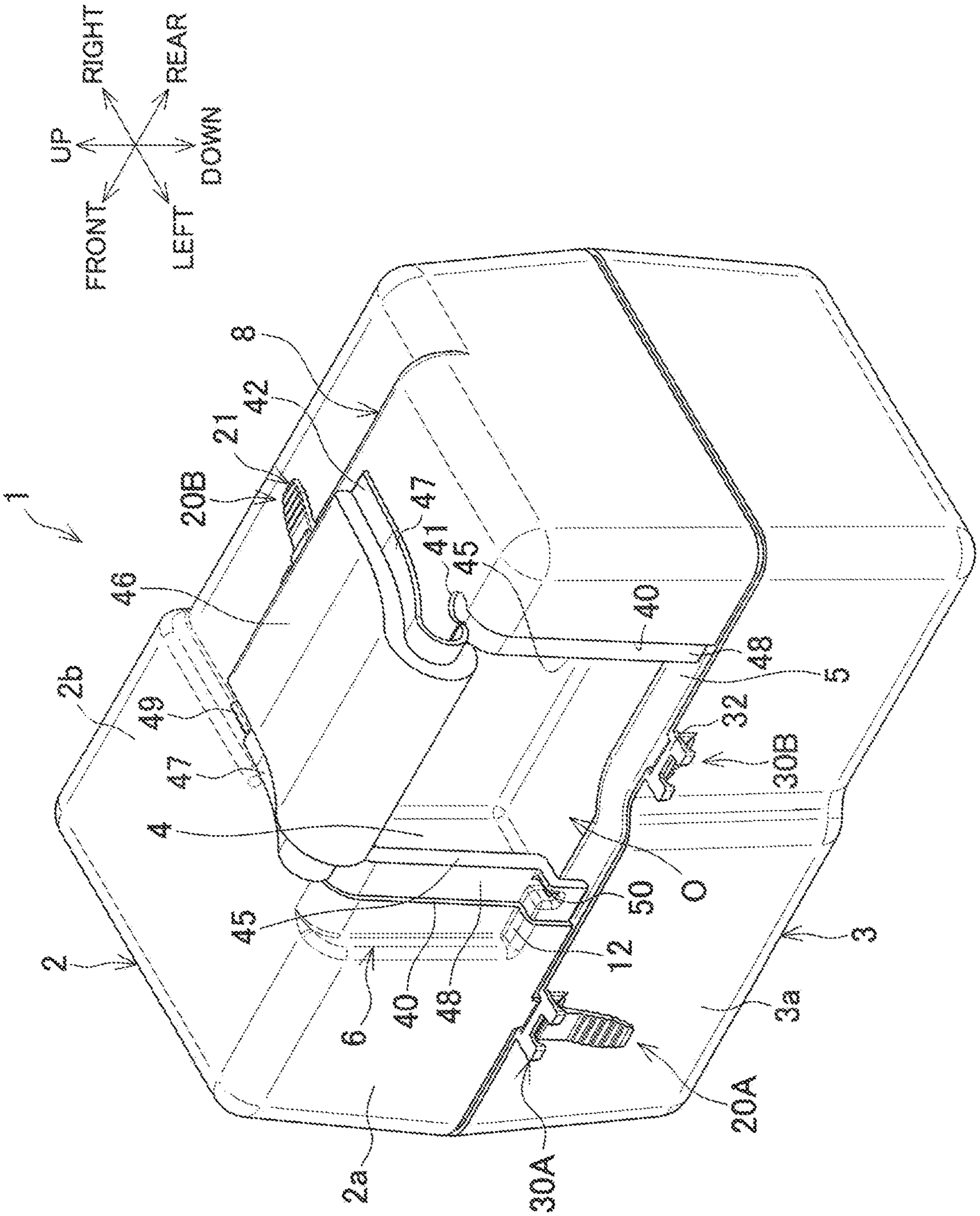
FIG. 10 is a perspective view of the cover with the opening/closing region in an open state.

As shown in FIG. 6 and FIG. 10, a locking pawl 49 is formed downward on the inner side of the lower end of the outer projecting portion 47 on the front side that forms the intermediate portion 12 of the first stepped portion 6. A locking hole 50 into which the locking pawl 49 is inserted and locked in the closed state of the opening/closing region 42 is formed in the bottom surface of the recessed portion formed on the outer side of the lower end of the inner projecting portion 48 on the front side. The locking between the locking pawl 49 and the locking hole 50 maintains the closed state of the opening/closing region 42.

When using the cover 1 configured as described above, first, half of the object M is covered with one of the first cover body 2 and the second cover body 3. In this state, the first locking portions 20A and 20B and the second locking portions 30A and 30B opposed to each other are locked respectively while covering the other half of the object M with the other of the first cover body 2 and the second cover body 3. Specifically, the insertion plates 26 of the protrusion pieces 21 of the first locking portions 20A and 20B are inserted into the insertion holes 34 of the bridge portions 32 of the second locking portions 30A and 30B, and are pulled in the abutting direction D until the return pieces 22 pass through the bridge portions 32. When the return piece 22 passes through the bridge portion 32, the bridge portion 32 is elastically locked in the groove 28. Then, as shown in FIG. 6 and FIG. 7, the first locking portions 20A and 20B are locked to the second locking portions 30A and 30B and are prevented from coming off, and the object M is covered by the cover 1.

In this way, the bridge portion 32 is elastically locked in the groove 28 and prevents the first locking portions 20A and 20B from coming off, so it is less likely for the mutual locking to be accidentally released due to an external impact or the like. In particular, since the return piece 22 is located on the outer side of the bridge portion 32, the bridge portion 32 is less likely to come off from the groove 28.

It should be noted that a gap S (FIG. 6) is formed between the first cover body 2 and the second cover body 3 while the object M is covered. Therefore, a cable or the like connected to the object M may be pulled out from the gap S.

Figure 9:
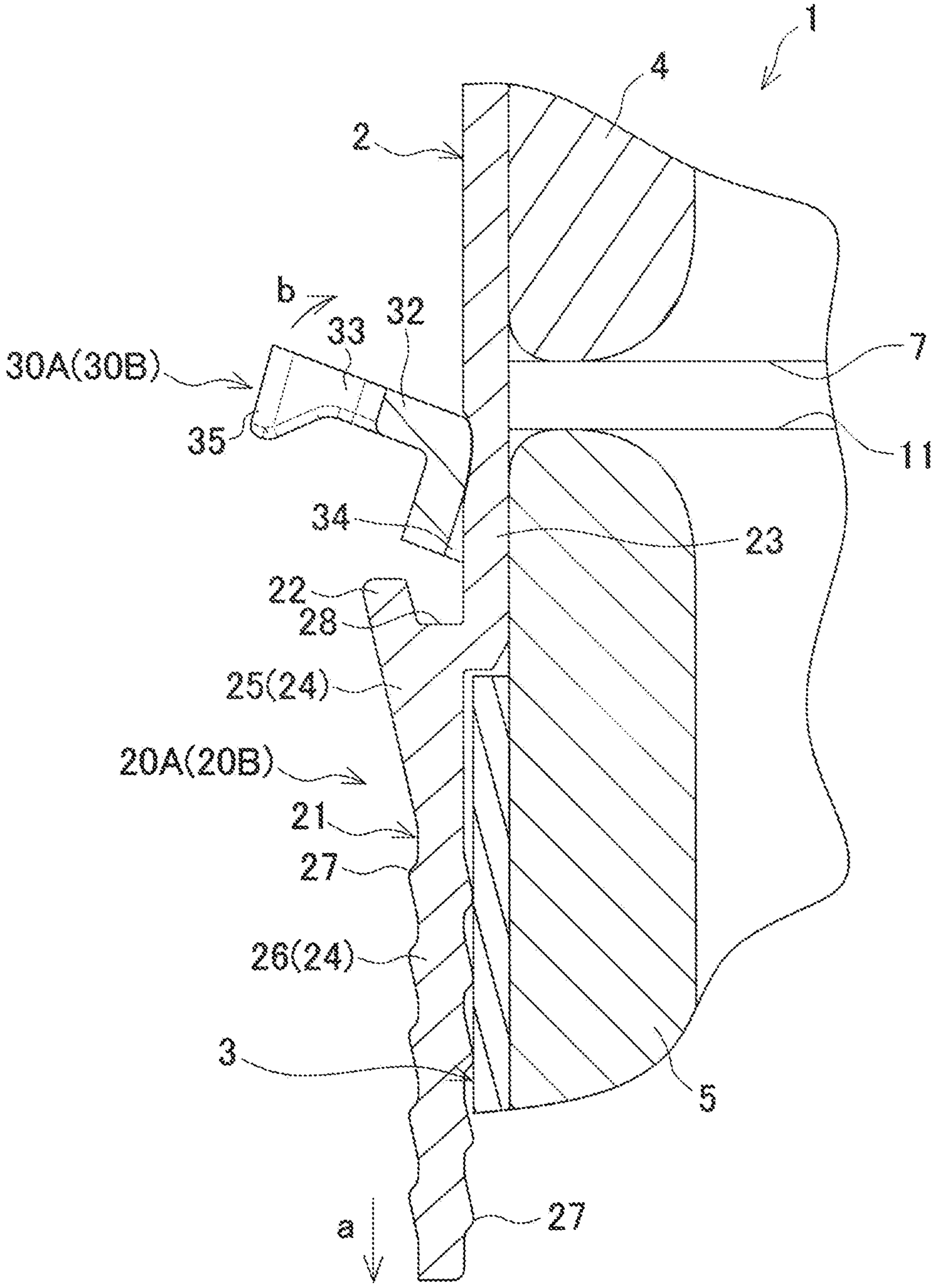
FIG. 9 is an illustrative view showing the state of the first locking portion and the second locking portion when the cover is removed.

On the other hand, in the case of removing the cover 1 from the object M, the insertion plates 26 of the protrusion pieces 21 of the first locking portions 20A and 20B are gripped and pulled toward the side of the second cover body 3, as shown by the arrow a in FIG. 9. Then, the groove 28 can be separated from the bridge portion 32 to release the retention. At this time, the projection portions 33 and 33 of the second locking portions 30A and 30B are tilted toward the side of the first cover body 2 via the head portions 35 and 35, as shown by the arrow b. Then, the bridge portion 32 as well as the projection portions 33 and 33 elastically move toward the side of the first cover body 2. Therefore, the bridge portion 32 can be easily separated from the groove 28.

When the groove 28 is separated from the bridge portion 32, the base end portion 23 together with the return piece 22 is passed through the insertion hole 34 from the inner side of the bridge portion 32 and removed from the second locking portions 30A and 30B. Subsequently, the distal end portion 24 is also passed through the insertion hole 34 from the inner side of the bridge portion 32 and removed from the second locking portions 30A and 30B. By releasing the locking between the first locking portions 20A and 20B and the second locking portions 30A and 30B in this way, the first cover body 2 and the second cover body 3 can be removed from the object M.

Next, a case in which maintenance and inspection of the terminal parts or the like of the object M are performed with the cover 1 attached will be described.

First, the protrusion piece 21 of the first locking portion 20B connected to the opening/closing region 42 is removed from the second locking portion 30B. Next, the protrusion piece 21 is gripped directly to fold back the opening/closing region 42 together with the inner opening/closing region 46 toward the side of the upper surface 2*b*. At this time, the locking pawl 49 of the opening/closing region 42 is pulled out from the locking hole 50 without resistance due to the elasticity of the first sound absorbing material 4, so there is no problem in folding back the opening/closing region 42.

Figure 11:
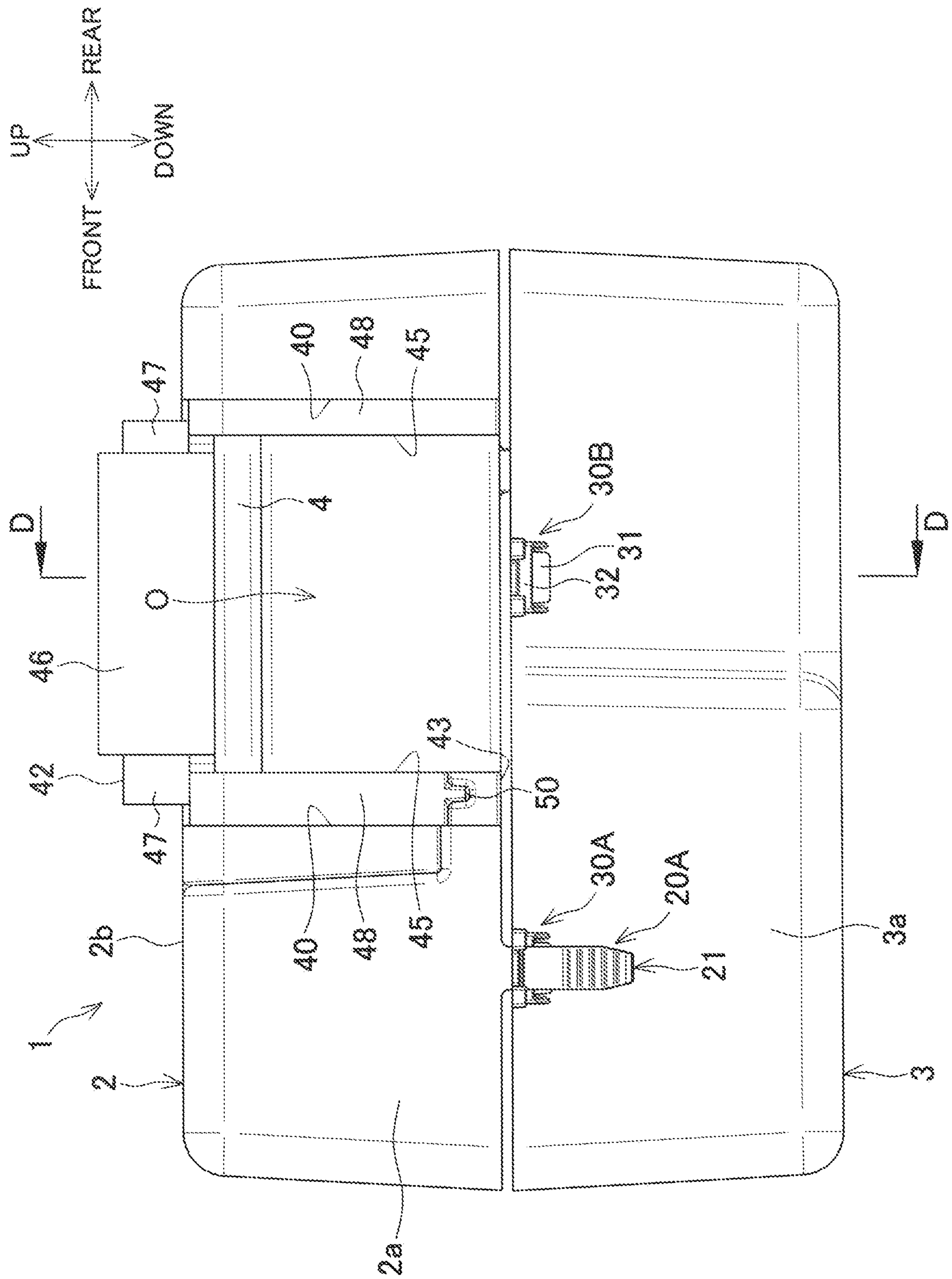
FIG. 11 is a left side view of the cover with the opening/closing region in an open state.
Figure 12:
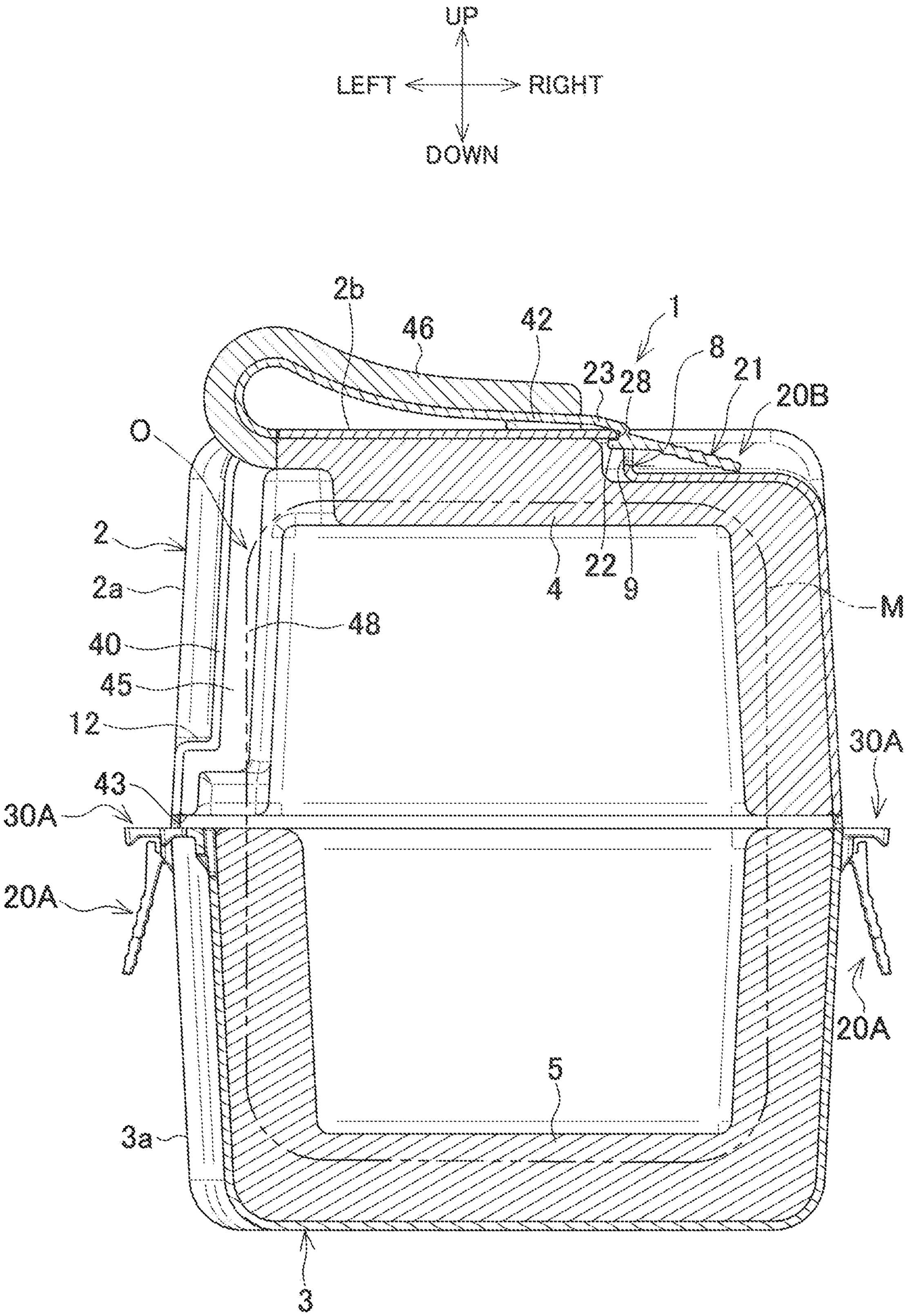
FIG. 12 is a cross-sectional view taken along the line D-D in FIG. 11.

With the opening/closing region 42 and the inner opening/closing region 46 folded back in this manner, the return piece 22 of the protrusion piece 21 is inserted into the hole 9 of the upper surface stepped portion 8, as shown in FIG. 10 to FIG. 12. Then, the groove 28 is locked to the edge portion on the upper side of the hole 9, so that the opening/closing region 42 and the inner opening/closing region 46 are kept in the open state. Therefore, an opening O is partially formed in the left side surface 2*a* to expose the terminal parts or the like. Thus, the operator is allowed to perform maintenance, inspection, etc. of the object M through the opening O without holding down the opening/closing region 42 and the inner opening/closing region 46 with his/her hand.

When the work is finished, the protrusion piece 21 of the opening/closing region 42 is gripped and pulled to the right side. Then, the return piece 22 is separated from the hole 9 and released from the locking, so that the opening/closing region 42 and the inner opening/closing region 46 can be rotated toward the left side surface 2*a* and returned to the closed state. Next, by locking the locking pawl 49 in the locking hole 50 and inserting the protrusion piece 21 into the insertion hole 34 of the second locking portion 30B to prevent the protrusion piece 21 from coming off, the closed state is maintained.

Thus, the cover 1 of the above embodiment includes: the first cover body 2 that is made of elastomer and integrally has the first locking portions 20A and 20B on the lower end edge 7, and the second cover body 3 that is made of elastomer and integrally has the second locking portions 30A and 30B which can be locked to the first locking portions 20A and 20B on the upper end edge 11 opposed to the lower end edge 7.

The cover 1 is capable of covering the object M with the first cover body 2 and the second cover body 3 by locking the first locking portions 20A and 20B and the second locking portions 30A and 30B to each other with the lower end edge 7 and the upper end edge 11 abutting against each other.

The first cover body 2 includes a pair of first slits 40 and 40 that are formed with the first locking portion 20B in between and extend in a direction intersecting the lower end edge 7 starting from the lower end edge 7, and the hole 9 provided on the terminal end side of the first slits 40 and 40.

Then, the object M can be partially exposed by locking the first locking portion 20B to the hole 9 in the state where the opening/closing region 42 having the first locking portion 20B and sandwiched between the pair of first slits 40 and 40 is folded back to the side of the terminal ends 41 and 41 of the first slits 40 and 40 along the pair of first slits 40 and 40.

According to this configuration, the covered state of the object M can be properly maintained with a simple structure even though the cover bodies are made of elastomer. Therefore, a highly reliable cover 1 can be provided.

Furthermore, by locking the first locking portion 20B in the hole 9 with the opening/closing region 42 folded back, the open state can be maintained even if the operator does not hold down the opening/closing region 42 with his/her hand, and the object M can be exposed with the cover 1 attached. Therefore, it is possible to carry out the inspection work on necessary parts with good workability while keeping the covered state. In particular, since the first locking portion 20B for attaching the cover is used to maintain the open state of the opening/closing region 42, the configuration is rational.

The first locking portion 20B includes the protrusion piece 21 that protrudes in the abutting direction D from the lower end edge 7 to the upper end edge 11, and the return piece 22 that protrudes from the protrusion piece 21 to the side opposite to the abutting direction D. The locked portion is the hole 9 through which the return piece 22 can be inserted.

Therefore, the open state of the opening/closing region 42 can be maintained with a simple structure in which the return piece 22 is inserted into the hole 9 and locked.

The first locking portion 20B has the groove 28 formed between the protrusion piece 21 and the return piece 22. The hole 9 is provided on the extended surface of the opening/closing region 42 when the object M is covered by the opening/closing region 42. When the return piece 22 is inserted into the hole 9, the groove 28 is locked to the edge portion of the hole 9.

Therefore, the locked state between the return piece 22 and the hole 9 is effectively maintained, and the opening/closing region 42 in the open state is less likely to return to the closed state unexpectedly.

The first cover body 2 includes the upper surface stepped portion 8 that is recessed from the front surface toward the back surface side, and the hole 9 is provided in the upper surface stepped portion 8.

Therefore, by utilizing the upper surface stepped portion 8, the hole 9 can be provided at a position that allows the first locking portion 20B to lock easily.

The first sound absorbing material 4 made of foamed resin is arranged on the inner surface of the first cover body 2. A pair of second slits 45 and 45 are formed in the first sound absorbing material 4 on the inner side of the opening/closing region 42 to extend in the direction that intersects the lower end edge 7 starting from the inner end edge 43 parallel to the lower end edge 7. The object M can be partially exposed in the state where the inner opening/closing region 46 of the first sound absorbing material 4 sandwiched between the pair of second slits 45 and 45 is folded back together with the opening/closing region 42 to the terminal end side of the second slits 45 and 45 along the pair of second slits 45 and 45.

Then, when the object M is covered by the opening/closing region 42, the pair of second slits 45 and 45 are covered by the opening/closing region 42.

Therefore, even though the first sound absorbing material 4 is provided on the inner side of the first cover body 2, the object M can be exposed by opening the inner opening/closing region 46. Moreover, since the second slits 45 and 45 are covered by the opening/closing region 42 in the closed state, even though the first sound absorbing material 4 has the second slits 45 and 45, the covered state of the object M can be maintained, and foreign matter can be prevented from entering from the outside.

The inner opening/closing region 46 is fixed to the opening/closing region 42.

Therefore, the inner opening/closing region 46 automatically follows the opening and closing of the opening/closing region 42. Even with the inner opening/closing region 46, the opening/closing region 42 can be opened and closed without any hindrance.

The second locking portions 30A and 30B each include the notch 31 formed in the abutting direction D from the upper end edge 11, and the bridge portion 32 formed along the upper end edge 11 so as to straddle the notch 31 on the outer surface side of the second cover body 3. The insertion hole 34 communicating with the notch 31 is formed on the inner side of the bridge portion 32.

Then, by inserting the protrusion piece 21 into the insertion hole 34 and locking the return piece 22 to the bridge portion 32, the first locking portions 20A and 20B are locked to the second locking portions 30A and 30B.

Therefore, it is possible to easily lock and unlock the first locking portions 20A and 20B and the second locking portions 30A and 30B.

The protrusion piece 21 includes the base end portion 23 that protrudes from the upper end edge 11, and the distal end portion 24 that protrudes in the abutting direction D from the protruding end portion of the base end portion 23. The return piece 22 is formed between the base end portion 23 and the distal end portion 24, and the groove 28 that opens on the side opposite to the abutting direction D is formed between the base end portion 23 and the distal end portion 24.

Then, in the state where the distal end portion 24 and the base end portion 23 are inserted into the insertion hole 34, the groove 28 is locked to the bridge portion 32 and the return piece 22 is located on the outer side of the bridge portion 32, so that the first locking portions 20A and 20B are locked to the second locking portions 30A and 30B in a non-removal state.

Therefore, the reliability of the locked state between the first locking portions 20A and 20B and the second locking portions 30A and 30B can be improved.

The protrusions 27 are formed on both the outer and inner surfaces of the insertion plate 26.

Therefore, the protrusions 27 prevent slip when the operator grips the insertion plate 26, making it easy to operate.

The bridge portion 32 is arranged at a position spaced outward from the outer surface of the second cover body 3.

Therefore, the protrusion pieces 21 of the first locking portions 20A and 20B can be easily inserted into the inner side of the bridge portion 32.

The projection portion 33 that protrudes toward the outer side is provided on the outer surface of the bridge portion 32.

Therefore, when removing the cover 1, the bridge portion 32 can be elastically deformed in the direction away from the groove 28 using the projection portion 33, making it easy to unlock the first locking portions 20A and 20B and the second locking portions 30A and 30B.

The first sound absorbing material 4 and the second sound absorbing material 5 made of urethane foam are arranged on the inner surfaces of the first cover body 2 and the second cover body 3.

Therefore, the sound insulation effect when covering the object M is enhanced.

Modified examples of the disclosure will be described below.

The opening/closing region may be formed so that the first locking portion is located near the front or rear of the opening/closing region. The opening/closing region can be changed as appropriate according to the position and size of the part of the object to be exposed. Therefore, the terminal end of the first slit may be located closer to the right of the upper surface of the first cover body than in the above embodiment. Conversely, the terminal end of the first slit may be located on the left side surface of the first cover body instead of on the upper surface. The first slit may have a curved shape.

There may be a plurality of opening/closing regions. The opening/closing region is not limited to the left side surface of the first cover body, but may be formed on other surfaces.

The angle at which the first slit extends is not limited to being orthogonal to the first end edge as in the above embodiment, and the first slit may be in any direction that intersects the first end edge. Therefore, the opening/closing region is not limited to a rectangular shape.

The locked portion that locks the first locking portion by folding back the opening/closing region may be a recess instead of a hole, as long as the first locking portion can be locked. The first locking portion to be locked to the locked portion may also lock a portion other than the return piece.

The inner opening/closing region may not be fixed to the opening/closing region. In this case, a locking portion that locks with the opening/closing region may be provided, so that the inner opening/closing region can follow the opening and closing of the opening/closing region.

The shapes of the first and second stepped portions and the upper surface stepped portion of the first cover body can be changed as appropriate. For example, the first stepped portion may not have a bent shape but have only a portion extending in the up-down direction. The upper surface stepped portion may also have a shape extending in the front-rear direction over the entire upper surface. However, the first and second stepped portions may be omitted. The upper surface stepped portion may also be omitted as long as it is possible to form a locked portion for locking the first locking portion. Further, the upper surface stepped portion may be omitted, and a locked portion for locking the first locking portion may be formed on the right side surface.

The second slit provided in the first sound absorbing material can also be changed as appropriate to match the first slit. The second slits may be formed at the same interval as the first slits.

The configuration of the locking pawl and the locking hole that maintain the closed state may be provided reversely, or other locking structures may be adopted as long as the opening/closing region can be positioned in the closed state. This locking structure may be provided not at the front but at the rear of the opening/closing region, or may be provided at both the front and rear. This locking structure may be omitted.

In the above embodiment, two first locking portions are respectively provided on the left and right sides of the first end edge of the first cover body, but the number of first locking portions is not limited to two, and three or more first locking portions may be provided. Therefore, the opening/closing region may have a plurality of first locking portions. In this case, a plurality of locked portions may be provided.

There may be one first locking portion on the side opposite to the side where the opening/closing region is formed. The second locking portions of the second cover body can also be changed as appropriate according to the number and positions of the first locking portions.

The shape of the first locking portion itself can also be changed as appropriate. For example, the shape and number of the protrusions provided on the insertion plate are not limited to the above embodiment. The protrusions may be provided on only one surface of the insertion plate instead of on both the front and back surfaces. The protrusions may also be omitted. The insertion plate may be provided continuously without forming an angle with respect to the locking plate.

The shape and number of the projection portions on the second locking portion are not limited to the above embodiment. The projection portions may have shapes with the upper ends connected to each other. The projection portions may also be omitted.

Also, the overall shape of the cover is not limited to a rectangular parallelepiped. The overall shape of the cover may be, for example, cylindrical, and can be changed as appropriate according to the shape of the object.

The first and second sound absorbing materials are not necessarily made of urethane foam, and may be made of other foamed resins. The first and second sound absorbing materials may be provided partially or may be omitted as long as the first and second cover bodies provide the desired sound insulation performance.

What is claimed is:

1. A cover, comprising:

a first cover body made of elastomer and integrally comprising a first locking portion on a first end edge; and a second cover body made of elastomer and integrally comprising a second locking portion that is lockable to the first locking portion on a second end edge opposed to the first end edge, wherein the cover is configured to cover an object with the first cover body and the second cover body by locking the first locking portion and the second locking portion to each other in a state where the first end edge and the second end edge abut against each other, the first cover body comprises:

a pair of first slits formed on both sides of the first locking portion and extending in a direction that intersects the first end edge starting from the first end edge; and a locked portion provided on a terminal end side of the first slits, and the cover is configured to partially expose the object by locking the first locking portion to the locked portion in a state where an opening/closing region that comprises the first locking portion and is sandwiched between the pair of first slits is folded back to the terminal end side of the first slits along the pair of first slits.

2. The cover according to claim 1, wherein the first locking portion comprises a protrusion piece that protrudes in an abutting direction from the first end edge to the second end edge, and a return piece that protrudes from the protrusion piece toward a side opposite to the abutting direction, and the locked portion is a hole through which the return piece is insertable.

3. The cover according to claim 2, wherein the first locking portion has a groove formed between the protrusion piece and the return piece, the hole is provided on an extended surface of the opening/closing region in a state where the object is covered by the opening/closing region, and the groove is locked to an edge portion of the hole in response to the return piece being inserted into the hole.

4. The cover according to claim 3, wherein the first cover body comprises a stepped portion that is recessed from a front surface toward a back surface side, and the hole is provided in the stepped portion.

5. The cover according to claim 1, further comprising a first sound absorbing material that is made of foamed resin and arranged on an inner surface of the first cover body, wherein the first sound absorbing material has a pair of second slits formed on an inner side of the opening/closing region, and the pair of second slits extend in a direction that intersects the first end edge starting from an inner end edge located on the first end edge side, the cover is configured to partially expose the object in a state where an inner opening/closing region of the first sound absorbing material sandwiched between the pair of second slits is folded back together with the opening/closing region to a terminal end side of the second slits along the pair of second slits, and the pair of second slits are covered by the opening/closing region in a state where the object is covered by the opening/closing region.

6. The cover according to claim 5, wherein the inner opening/closing region is fixed to the opening/closing region.

7. The cover according to claim 2, wherein the second locking portion comprises a notch that is formed in the abutting direction from the second end edge, and a bridge portion that is formed along the second end edge so as to straddle the notch on an outer surface side of the second cover body, an insertion hole communicating with the notch is formed on an inner side of the bridge portion, and the first locking portion is locked to the second locking portion by inserting the protrusion piece into the insertion hole and locking the return piece to the bridge portion.

8. The cover according to claim 7, wherein the protrusion piece comprises a base end portion that protrudes from the first end edge, and a distal end portion that protrudes from a protruding end portion of the base end portion in the abutting direction, wherein the return piece is formed between the base end portion and the distal end portion, and a groove that opens on a side opposite to the abutting direction is formed between the base end portion and the distal end portion, and the first locking portion is locked to the second locking portion in a non-removal state by locking the groove to the bridge portion and positioning the return piece on an outer side of the bridge portion in a state where the distal end portion and the base end portion are inserted into the insertion hole.

* * * * *